United States Patent
Pyeon et al.

(10) Patent No.: US 8,222,930 B2
(45) Date of Patent: Jul. 17, 2012

(54) POWER UP CIRCUIT WITH LOW POWER SLEEP MODE OPERATION

(75) Inventors: Hong Beom Pyeon, Kanata (CA); Peter Vlasenko, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 144 days.

(21) Appl. No.: 12/552,040

(22) Filed: Sep. 1, 2009

(65) Prior Publication Data

US 2009/0315591 A1  Dec. 24, 2009

Related U.S. Application Data

(63) Continuation of application No. 11/238,973, filed on Sep. 30, 2005, now Pat. No. 7,602,222.

(51) Int. Cl.
*H03L 7/00* (2006.01)

(52) U.S. Cl. .......................... 327/143; 327/198

(58) Field of Classification Search .................. 327/142, 327/143, 51, 57, 52, 53, 560, 563, 77, 198
See application file for complete search history.

(56) References Cited

U.S. PATENT DOCUMENTS

| | | |
|---|---|---|
| 4,210,829 A | 7/1980 | Wong et al. |
| 5,646,902 A | 7/1997 | Park |
| 5,691,887 A | 11/1997 | Sher |
| 5,808,460 A | 9/1998 | Wei et al. |
| 5,828,251 A | 10/1998 | Freyman et al. |
| 5,898,635 A | 4/1999 | Raad et al. |
| 6,339,344 B1 * | 1/2002 | Sakata et al. .................. 326/83 |
| 6,438,051 B1 * | 8/2002 | Fifield et al. ................. 365/207 |

(Continued)

FOREIGN PATENT DOCUMENTS

EP  0609497  7/1999

(Continued)

OTHER PUBLICATIONS

U.S. Appl. No. 11/238,973 Notice of Allowance dated Jun. 17, 2009.

*Primary Examiner* — Lincoln Donovan
*Assistant Examiner* — Diana J Cheng
(74) *Attorney, Agent, or Firm* — Mukundan Chakrapani; Borden Ladner Gervais LLP

(57) ABSTRACT

A power up circuit that having reduced power consumption during power saving modes, while maintaining an active flag signal indicating that the power supply voltage is satisfactory. This is achieved by turning off the power up circuit during the power saving mode, and using a status holding circuit to maintain the active flag signal in response to the power down signal. The status holding circuit is responsive to an internal node of the power up circuit for generating the active flag signal when the internal node has reached a predetermined level. The power down signal can be one or both a sleep mode signal and a deep power down signal. The status holding comprises an override circuit for maintaining the active flag signal in the power saving mode, and a restore circuit for rapidly resetting at least the internal node of the power up circuit upon exit of the power saving mode.

8 Claims, 12 Drawing Sheets

U.S. PATENT DOCUMENTS

| | | |
|---|---|---|
| 6,542,427 B2 | 4/2003 | Roohparvar |
| 6,720,808 B1 | 4/2004 | Chan |
| 6,731,562 B2 | 5/2004 | Roohparvar |
| 2002/0005740 A1 | 1/2002 | Kim |
| 2003/0117875 A1 | 6/2003 | Lee et al. |
| 2003/0189450 A1 | 10/2003 | Kamata |
| 2004/0041602 A1 | 3/2004 | Kawakubo |
| 2004/0164775 A1 | 8/2004 | Kim |
| 2004/0189357 A1 | 9/2004 | Kang et al. |
| 2005/0083098 A1 | 4/2005 | Matsui et al. |
| 2005/0123086 A1 | 6/2005 | Yoshimura et al. |
| 2005/0231245 A1 | 10/2005 | Marotta |
| 2005/0275375 A1 | 12/2005 | Liu et al. |

FOREIGN PATENT DOCUMENTS

JP    2003304146 A    10/2003

* cited by examiner

POWER UP CIRCUIT WITH LOW POWER SLEEP MODE OPERATION

CROSS-REFERENCE

This is a continuation of U.S. patent application Ser. No. 11/238,973 now U.S. Pat. No. 7,602,222, filed Sep. 30, 2005, and issued on Oct. 13, 2009, the contents of which are incorporated herein by reference.

TECHNICAL FIELD

The present invention relates generally to low power circuitry techniques. More particularly, the present invention relates to methods of minimising power consumption in power up circuits.

BACKGROUND OF THE INVENTION

Semiconductor devices, such as microprocessors, stand-alone and embedded memory devices, voltage reference circuits, power management circuits etc., require a certain sequence of operations to be run immediately after the power supply voltage has been turned on. Such sequence of operations is commonly known as a power up sequence. The power up sequence may include for example, resetting of storage elements (e.g. latches, flip-flops, registers), starting oscillators (e.g. in pumping power sources or PLLs), and enabling internal voltage sources or references in a particular order. The sequence normally takes a significant amount of time to complete, and starts after the power supply voltage has reached a certain minimum voltage level. The sequence normally does not have to be re-run until the power supply voltage has dropped below the minimum level. For most electronic devices, it is also important to have a stable and reliable power supply to ensure proper operation of logic functions, like pumping circuits, memory storage elements and other blocks that are sensitive to power supply voltage variations and it is important to know if the power supply voltage level accidentally drops below a certain level at any given time during operation. In other words, sometime power supply voltage level needs to be monitored.

The dependability of the power supply is especially important for instance in mobile applications where the power supply is a battery with a finite amount of amper-hours between recharges. A circuit typically used for assessing or monitoring the power supply voltage level and initiating a power up sequence in semiconductor devices is typically called power up detection circuit or power voltage (level) detector, or simply a power up circuit. The power up circuit monitors the voltage level of a power source, such as Vdd or Vcc power voltages, or input/output circuitry power supply voltage, and generates an active flag signal indicative of the voltage level being above the minimum required level. The supply voltage sensitive circuits use this active flag signal to either initiate or continue operation.

FIG. 1 is a circuit schematic of a prior art power up circuit. In this example the circuit is used for detecting the Vdd power supply voltage level. Power up circuit 10 includes a voltage divider circuit and a delay circuit. The voltage divider circuit consists of p-channel transistor 12, p-channel transistor 14 with its gate terminal connected to its drain terminal, commonly known to those of skill in the art as a diode connection, and resistor 16, all connected serially between the power supply Vdd and ground (Vss). P-channel transistor 12 has its gate terminal connected to a deep power down signal DEEP_PD for disconnecting Vdd from the voltage divider circuit. The delay circuit includes a series of inverters 18, 20, 22 and 24 connected between the common node of transistor 14 and resistor 16, and output PWR_OK. The output PWR_OK in the present example represents the active flag signal, where a high voltage level indicates that the Vdd power supply voltage is above the minimum level. Capacitors 26 and 28 are connected to the input terminals of inverters 12 and 16.

The operation of power up circuit 10 is as follows: after Vdd has been turned on, the Vdd voltage level starts increasing from ground or Vss to the Vdd nominal value. Those of skill in the art will understand that nominal voltages depend upon the particular application and/or circuit, but the embodiments of the present invention can be applied to monitoring any type of power supply voltage on a semiconductor device. While the Vdd voltage ramps up, signal DEEP_PD is held at the low voltage level of Vss or logic low, and direct current flows from Vdd through the DC path of transistors 12 and 14 and resistor 16. The input terminal of inverter 18 rises towards Vdd voltage level or logic high, and eventually reaches a voltage level that changes the output of inverter 18 from a logic high to a logic low voltage level. This changing of states propagates through the remaining inverters to drive PWR_OK to the logic high voltage level. In this example, PWR_OK at the high logic voltage level indicates that the Vdd voltage has reached and is maintained above a certain level sufficient for the power voltage level sensitive blocks to initiate or continue their safe operation.

Most battery-powered semiconductor devices have power saving modes to help reduce power consumption of the devices. One of the commonly known power saving modes is a deep power down mode. In the deep power down mode, the device is essentially turned off, where retention of data and logic states of circuit blocks is not required and quick return to normal operation is not expected. Therefore, monitoring of the power supply voltage level in the deep power down mode is not necessary. When the deep power down mode is entered in the example of FIG. 1, DEEP_PD is driven to the high logic voltage level, transistor 12 turns off and the Vdd node is decoupled from the voltage divider circuit. This effectively disables power up circuit 10, which is thus unable to track the Vdd voltage level, and results in PWR_OK eventually changing to the Vss low voltage level. It is important to note that in deep power-down mode power supply (e.g. Vdd, Vcc etc.) may or may not be turned off.

Another commonly known and more frequently used power saving mode is a standby mode, also referred to as a sleep mode. In the sleep mode, essential circuits, such as data storage elements (e.g. RAM, registers), reference sources, clock management circuits (e.g. DLL or PLL) remain powered, so that the device can return to an active mode in a relatively shorter time. In sleep mode, as well as in the normal operation mode, it is most often required that PWR_OK remains at the enabling voltage level to keep the essential circuits active and to prevent unnecessary initiation of the power sequence. At the same time, it is important to minimize power consumption and to disable every current consumption path that is not required for operation or for preserving logic states.

There are several problems with the presently known power up circuit 10 shown in FIG. 1. The voltage divider circuit will draw current from the Vdd supply as long as DEEP_PD is at the low voltage level. The current through the voltage divider circuit in power up circuit 10 can be cut off only when DEEP_PD is at the high voltage level, that is, only when the device is in the deep power down mode.

Also, the prior art circuit of FIG. 1 does not have provisions for maintaining the sleep mode. Replacing the DEEP_PD with a sleep mode signal, or logically combining them would still result in the input terminal of inverter 18 discharging towards Vss when a power saving mode is entered and the DC path through the voltage divider circuit is cut off. The PWR_OK signal then drops to the low voltage level Vss. Consequently re-entering the normal mode of operation will require a relatively long amount of time, since the entire power up sequence of the device will be re-run. Therefore, in the circuit of FIG. 1, transistor 12 must remain on during the sleep mode in order to keep the PWR_OK signal level high, current will be drawn through the voltage divider circuit. Although only a few microamperes of current normally consumed by a power up circuit, such as power up circuit 10 of FIG. 1, is very important for battery-powered applications.

Power conservation being critical for mobile products, power saving modes as previously discussed should be used frequently.

By example, conventional comparator circuits such as the dual mode comparator circuit shown in FIG. 2 has a normal and power saving mode of operation, where the power saving mode is used to maintain circuit functionality with minimum current consumption when circuit reaction time is not critical. The dual mode comparator circuit of FIG. 2 includes a normal differential circuit and a low power differential circuit. The normal differential circuit includes p-channel transistors 50 and 52 arranged in a current mirror configuration, n-channel input transistors 54 and 56, and n-channel current source transistor 58. Input transistor 54 receives signal VREF, input transistor 56 receives input signal VIN, while the gate terminal of current source transistor 58 receives a bias voltage VBIAS. VBIAS voltage is generated from the circuit consisting of transistors 60 and 62 connected in series between Vdd and Vss, where transistor 60 is controlled by signal SLEEP, and transistor 62 is connected in a diode configuration. A disable circuit consisting of n-channel transistor 64 that couples VBIAS to a low power supply rail Vss in response to signal SLEEP. The low power differential circuit includes p-channel transistors 66 and 68 arranged in a current mirror configuration, n-channel input transistors 70 and 72, and n-channel current source transistor 74. Input transistor 70 and the gate terminal of transistor 74 receives VREF, and input transistor 72 receives input signal VIN. It is noted that transistor 74 is sized to draw substantially less current than transistor 58.

In normal or high-speed operation, the SLEEP signal is set to the low voltage level such that both the normal differential and the low power differential circuits are turned on. In the low power mode of operation where speed is not critical, the SLEEP signal is set to the high voltage level to turn off the normal differential circuit by setting VBIAS to the Vss voltage level. Therefore, comparator functionality is still maintained, but with lower power consumption and longer response time than compared to the normal mode of operation.

In the case of the dual mode comparator circuit of FIG. 2, the time needed for recovery of the comparator from sleep mode is relatively short since activation of the normal differential circuit is immediate upon changing the state of the SLEEP signal from logic high to logic low.

In the case of power up circuits, it is important to ensure the short recovery time of the entire chip because it is unlikely that mobile device users will accept long wait periods for bringing their device from a power saving mode to the normal operation due to the time consuming re-running of power up sequences. One way to balance power conservation and time to return to normal operation after exiting a power saving mode, is to exit the power saving modes without re-running the power up sequence.

SUMMARY OF THE INVENTION

It is an object of the present invention to obviate or mitigate at least one disadvantage of previous power up circuits.

In a first aspect, the present invention provides a power up. The power up circuit can include a power detector circuit and a control circuit. The power detector circuit evaluates a power supply voltage level and generates an output signal indicative of the power supply voltage level being at least at a predetermined level. The power detector circuit can have at least one current path selectively disabled in a low power mode of operation. The control circuit maintains the value of the power up output signal while at least one current path is disabled.

According to an embodiment of the present aspect, the at least one current path includes a voltage divider circuit coupled between the power supply voltage level and ground, where the voltage divider circuit has a sense node coupled to the output signal. According to another embodiment of the present aspect, the power detector circuit further includes a delay circuit for delaying generation of the output signal in response to the sense node reaching the predetermined level. According to yet another embodiment of the present aspect, the output control circuit can include a latch circuit.

In aspects of the present embodiments, the output control circuit can include a logic gate and a status holding circuit. The logic gate provides the output signal, such that the logic gate preserves the output signal in response a hold signal, and the status holding circuit generates the hold signal in the low power mode of operation. The status holding circuit can receive a power save signal in the low power mode of operation, and the power detector circuit can include a sense circuit for sensing the predetermined level of the sense node. In a further embodiment, the sense circuit can include a differential sense amplifier circuit coupled to a current source circuit for selecting the current through the differential sense amplifier circuit, and the current source circuit can be selectively disabled in response to the low power mode of operation. In another aspect of the present embodiment, the power up circuit can include a restore circuit for resetting the sense node by driving at least one drive circuit coupled between the power supply voltage level and the sense node.

In a second aspect, the present invention provides power up circuit having a voltage divider, a sensing circuit, an output circuit, current disabling means, and a status holding circuit. T voltage divider is coupled to a power supply voltage level and has a sensing node tracking the power supply voltage level. The sensing circuit senses the voltage level of the sensing node and generates an intermediate signal corresponding to the sensing node being one of above and below a predetermined voltage level. The output circuit generates an output signal in response to said intermediate signal. The current disabling means cuts off a current path in at least one of the voltage divider and the sensing circuit in a low power mode of operation. The status holding circuit preserves a value of the output signal while the current path is disabled by said current disabling means.

According to embodiments of the second aspect, the current path is disabled in response to at least one of three low power mode signals, the three low power mode signals can include a sleep signal, a power-down signal and a power monitor signal, the output signal is fed-back for disabling the current path in the voltage divider or for disabling the current path in the sensing circuit, and the output circuit includes a latch for latching the output signal.

According to another embodiment of the present aspect, the voltage divider includes the current disabling means and a resistor means serially connected between the power supply voltage level and ground, the resistor means including the sensing node. The resistor means can include a diode-connected transistor connected between the current disabling means and the sensing node, and a resistor connected between the sensing node and ground. The current disabling means can include a transistor for decoupling the power supply voltage level from the resistor means in the low power mode of operation.

According to further embodiments of the present aspect, the sensing circuit includes an inverter, or can include a differential amplifier and a current source circuit. The differential amplifier compares the sensing node to a reference voltage and generates the intermediate signal. The current source circuit selects a current through the differential amplifier, the current source circuit being operable between a normal mode operation and the low power mode of operation.

According to other embodiments, the current source includes a first current branch and a second current branch enabled in the normal mode of operation, the first current branch including the current disabling means for disabling the current path through the first current branch in the low power mode of operation. The output signal can be fed-back to the current source circuit for disabling the second current branch. Furthermore, the current source can include a bias voltage circuit for providing a bias voltage to each of the first current branch and the second current branch. The bias voltage circuit includes the current disabling means for disabling the current path through the bias voltage circuit in the low power mode of operation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a power up circuit that minimizes power consumption, while maintaining an active flag signal indicating that the power up sequence does not need to be re-run. This is achieved by turning off all DC paths in the power up circuit for the time when monitoring of the power supply voltage level is not required, and using a status holding circuit to maintain the active flag signal at the enabling level. The status holding circuit is responsive to a voltage level at an internal sensing node of the power up circuit for generating the active flag signal when the power supply voltage has reached the minimum level. The status holding circuit is also responsive to a hold signal which overrides the signal of the internal sensing node. The hold signal is a product of a power save signal, which can be the sleep mode initiating signal, the deep power down mode initiating signal, or any suitable signal or logical combination thereof to cut off the DC path. The power up circuit according to present invention can optionally include a restore circuit for rapidly resetting voltage levels at internal nodes of the power up circuit upon exit a power saving mode, or returning to monitoring the power supply voltage level in the normal operation mode.

The embodiments of the present invention take advantage of the fact that the power up circuit, in most cases, does not need to monitor the power supply voltage level after the power up sequence has been run. The power up circuit is primarily used during the initial application of Vdd to the device. The enabling level of active flag signal of the power up circuit can be maintained during a power save mode or normal mode of operation when there is no need to monitor the Vdd voltage level, and therefore the DC path in the voltage divider circuit can be cut off.

Figure 3:
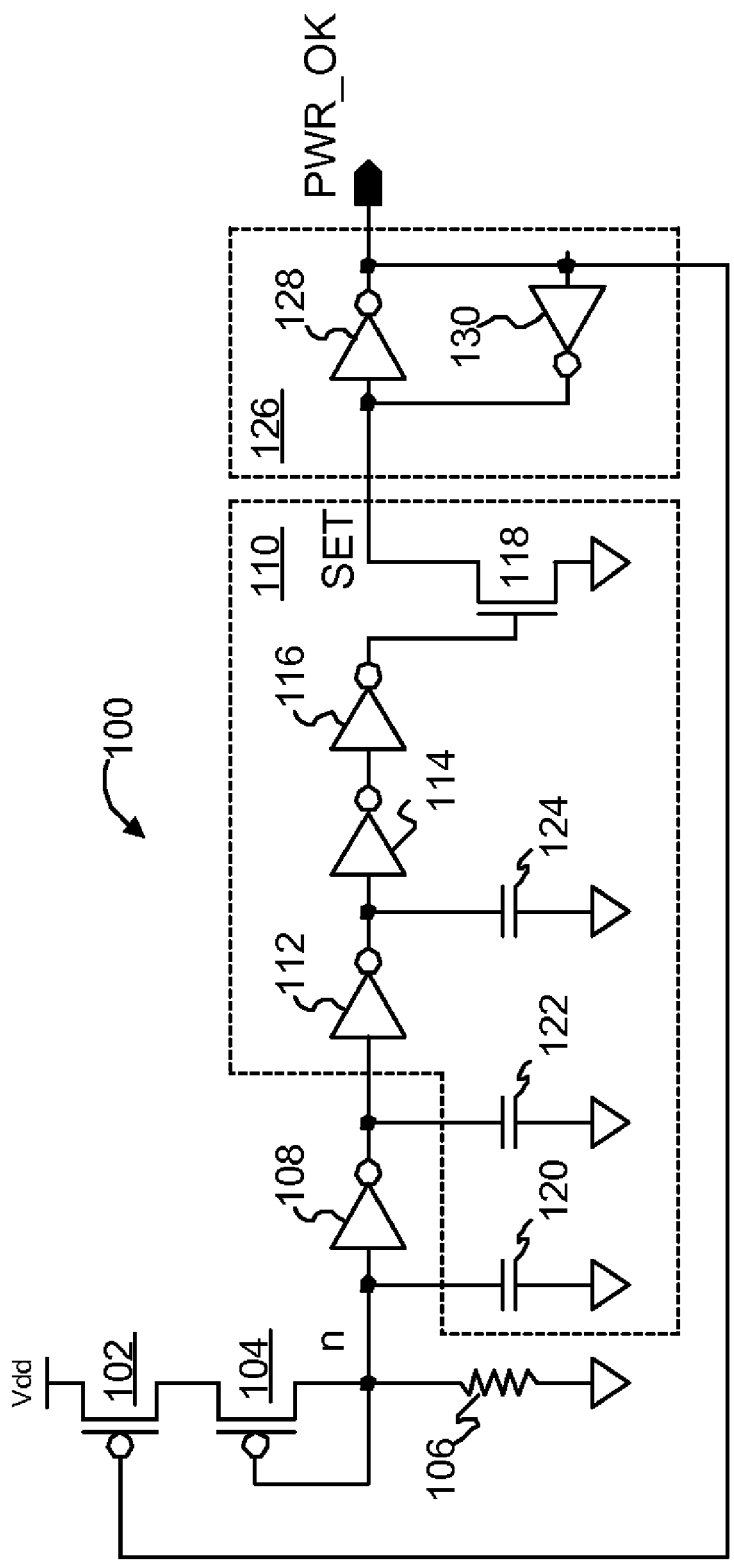
FIG. 3 is a circuit schematic of a power up circuit according to an embodiment of the present invention.

According to an embodiment of the present invention shown in FIG. 3, a power up circuit can have a self-disabling voltage divider circuit to reduce power consumption of the power detector circuit after Vdd has reached the minimum required voltage level. Since a latch circuit is included to hold the status of an active flag signal after Vdd has reached the minimum required voltage level, disabling the voltage divider circuit will have no effect on the state of the flag signal.

Figure 1:
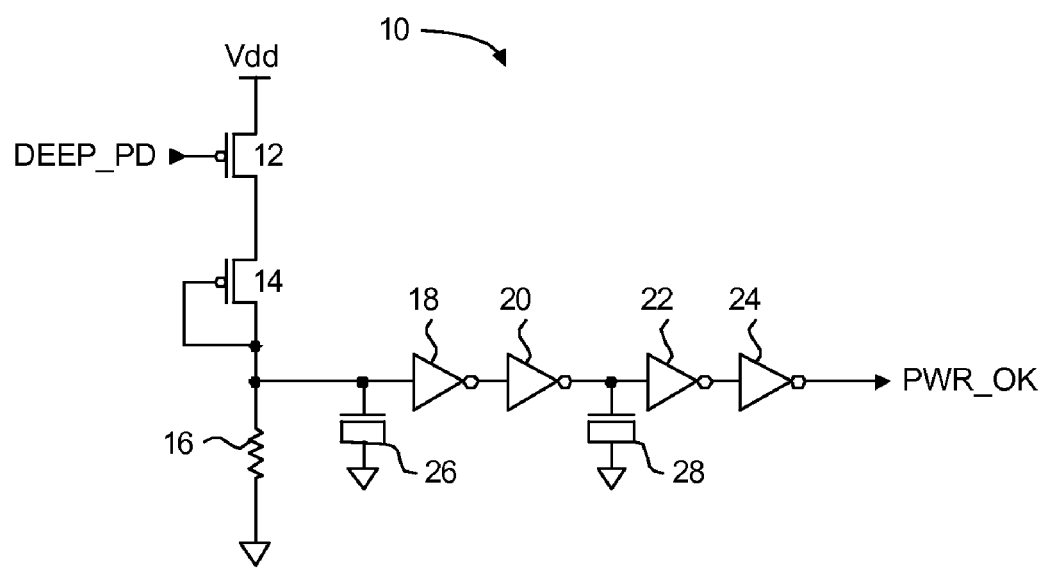
FIG. 1 is a circuit schematic of a prior art power up circuit.

Power up circuit 100 is functionally similar to the prior art power up circuit 10 of FIG. 1. Power up circuit 100 includes a voltage divider circuit, a sense circuit, a delay circuit and a latch circuit. The voltage divider circuit consists of p-channel coupling 102, p-channel diode connected transistor 104, and resistor 106, all connected serially between the power supply Vdd and Vss. The voltage divider can have one of the alternative structures described in the power up implementations below. Inverter 108 functions as a sense circuit for detecting voltage level at internal sensing node "n". The transition of the output signal from inverter 108 is delayed by a delay circuit 110 consisting of series connected inverters 112, 114, 116, n-channel transistor 118, and capacitors 120, 122, and 124. Capacitor 120 is connected to the input of inverter 108, capacitor 122 is connected to the input of inverter 112, and capacitor 122 is connected to the input of inverter 114. The output of inverter 116 is connected to the gate terminal of transistor 116, which couples node SET to the low power rail Vss. The latch circuit 126 includes cross-coupled inverters 128 and 130, where the input of inverter 128 is connected to node SET and the output of inverter 128 drives the active flag signal PWR_OK. Signal PWR_OK is fed back to the gate terminal of transistor 102. Provisions have to be made in latch 126 insuring that the PWR_OK signal level will always be in logic low state when the voltage Vdd is initially applied, that is when Vdd ramps up from ground potential Vss to the nominal Vdd voltage level, signal PWR_OK remains low until latch 126 is set by the signal from transistor 118. Such provisions can include for instance, additional uneven capacitive loads applied to nodes SET and PWR_OK, or accordingly sized transistors in the inverters 128 and 130 or use of other known techniques or combinations of such.

Figure 4:
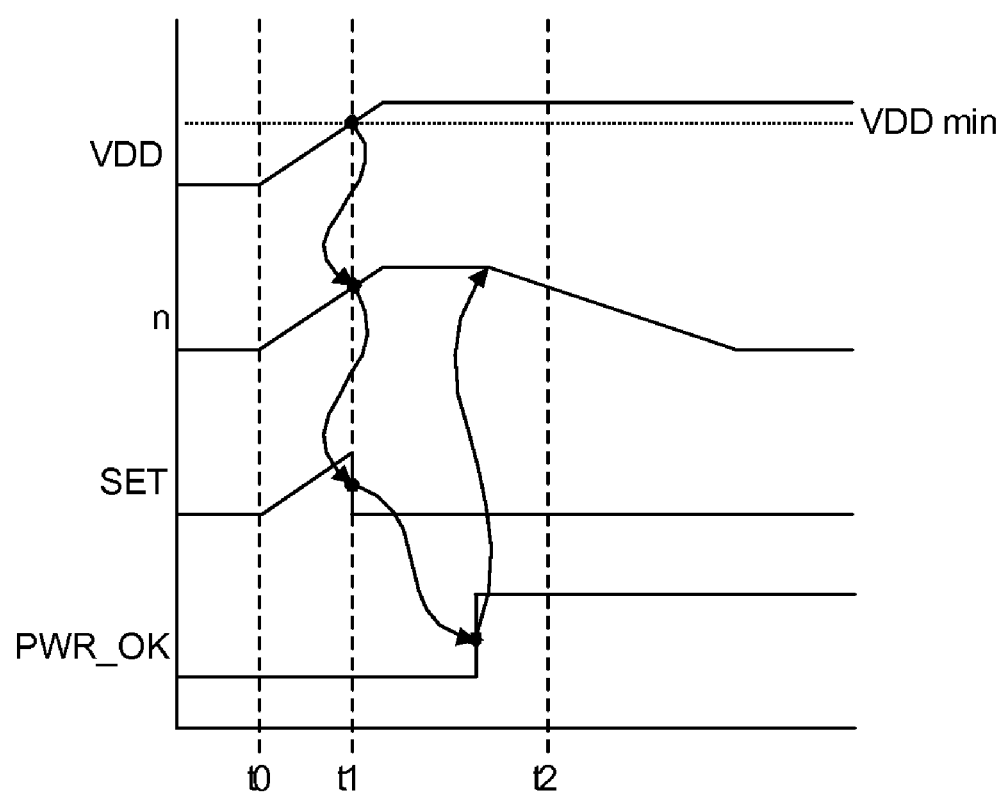
FIG. 4 is a sequence diagram illustrating the operation of the power up circuit of FIG. 3.

The operation of power up circuit 100 follows with reference to the sequence diagram of FIG. 4. At time t0, the Vdd voltage level is applied to the circuit, with the voltage at the internal sensing node "n" tracking the rise of Vdd. Due to the special provisions in the cross-coupled inverters 128 and 130, the voltage at node SET will ramp up with the Vdd voltage level, thus keeping signal PWR_OK at the low voltage level Vss. Eventually at time t1, the voltage at the internal sensing node "n" will reach the minimum critical level, resulting in inverter 116 driving the gate of set transistor 118 to the high voltage level, turning it on to couple node SET to the Vss power rail. Inverter 128 then drives PWR_OK to the high voltage level, which turns off transistor 102. The internal sensing node "n" will then discharge towards Vss. Therefore, power up circuit 100 will self-disable its voltage divider circuit to save power once the supply voltage Vdd has reached the desired level, while maintaining the state of PWR_OK at the enabling level.

The power up circuit 100 of FIG. 3 is suitable for applications that do not need to track or monitor the level of Vdd voltage once nominal Vdd level has been reached during power-up, and is effective for reducing power consumption after successful powering up of the circuit. Thus, once PWR_OK is set to the high voltage level it will drop to the low voltage level only when the Vdd power supply is turned off.

Figure 5:
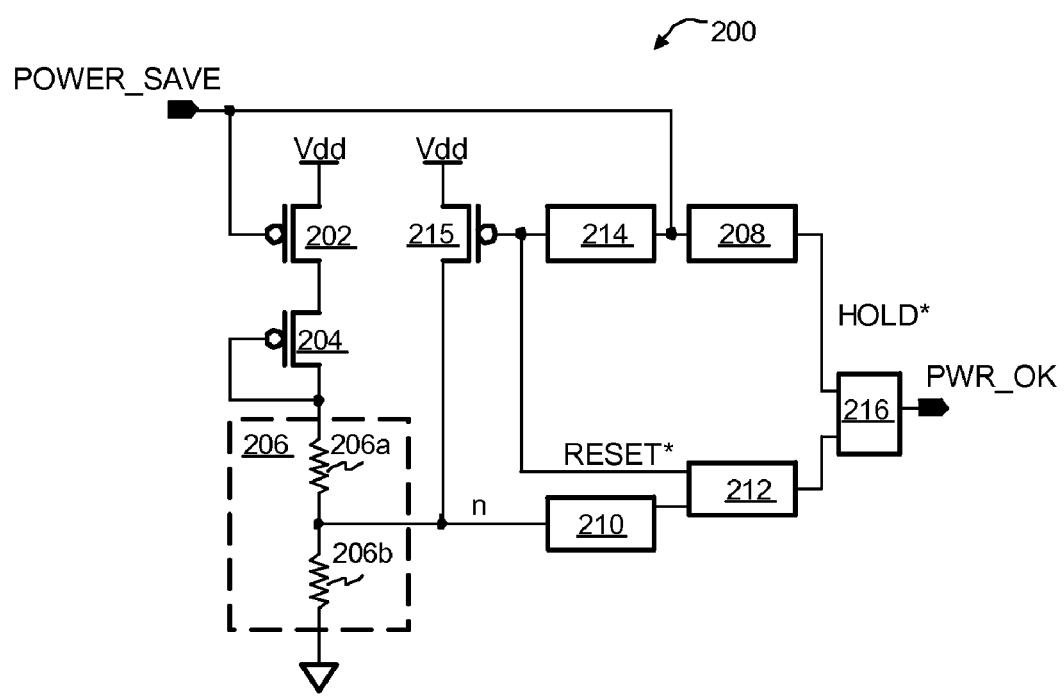
FIG. 5 is a schematic of generic power supply monitoring circuit with a power saving mode of operation, according to an embodiment of the present invention.
Figure 6:
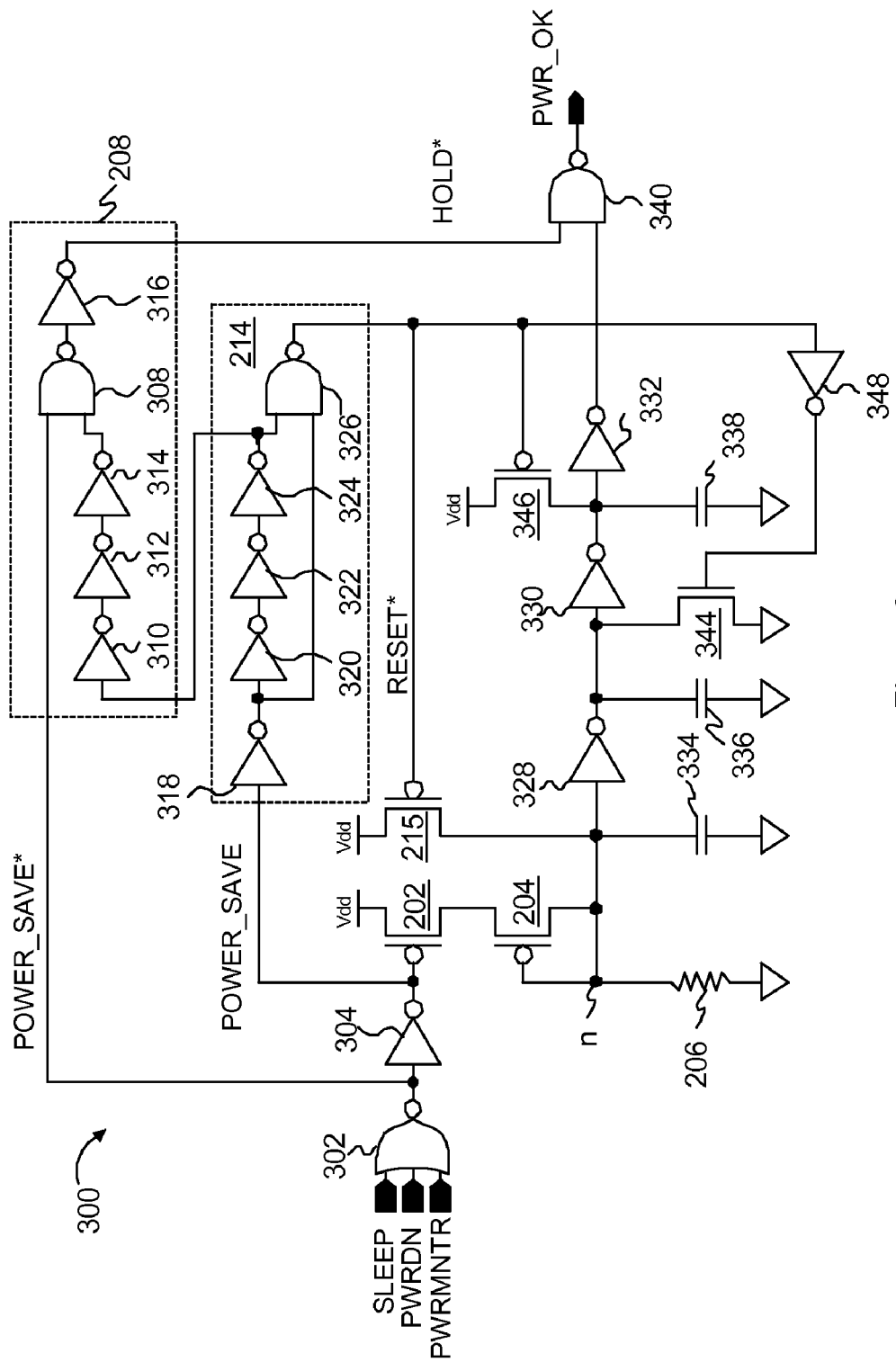
FIG. 6 is a circuit schematic of a power supply monitoring circuit with a power saving mode of operation according to an embodiment of the present invention.
Figure 8:
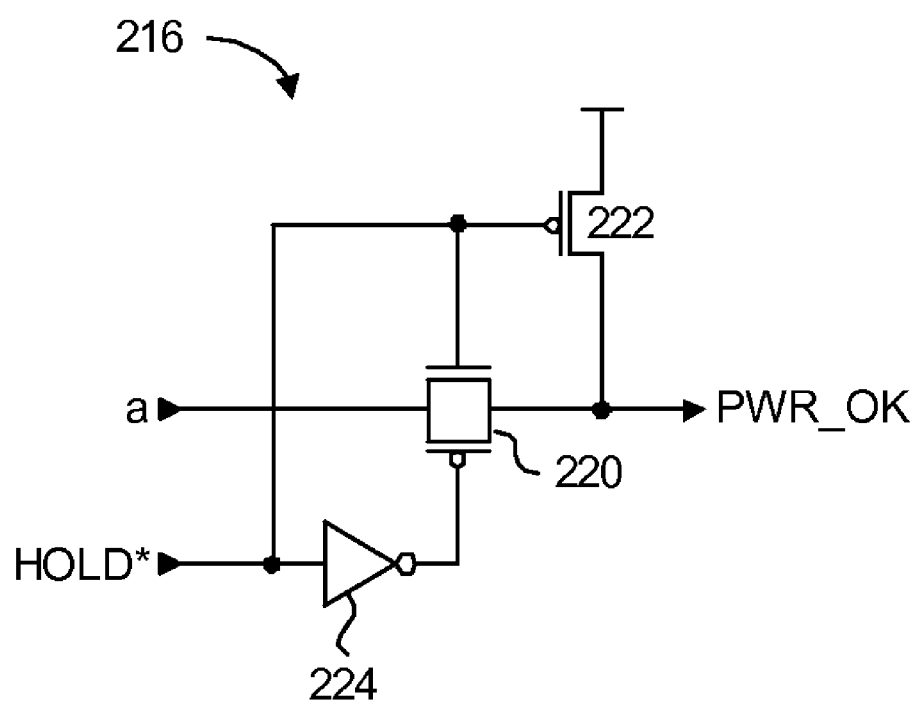
FIG. 8 is a circuit schematic of an output override circuit.

As previously noted, there are many applications, such as in portable mobile devices, where power saving modes of operation are important techniques for extending operation time of the mobile device. More specifically, the CPU or user can instruct the device to operate in one or more power saving modes. FIGS. 5, 6 and 8 illustrate embodiments of power up circuits that can be selectively able to operate in several power saving modes.

FIG. 5 is a circuit schematic of a power up circuit according to an embodiment of the present invention. Power up circuit 200 in the embodiment comprises a power detector circuit with additional digital circuits for managing the power up circuit in normal and power saving modes of operation. The power detector circuit includes a voltage divider circuit, a sense circuit and a delay circuit. The voltage divider circuit drives an internal sensing node labelled "n" in FIG. 5 to a predetermined voltage level as the supply voltage rises towards the nominal Vdd voltage level. The voltage divider circuit includes a p-channel coupling transistor 202, diode connected p-channel transistor 204 and a resistor means 206 serially connected between Vdd and Vss power rails. In the present example, resistor means 206 includes resistor elements 206a and 206b. A sensing circuit 210 detects the predetermined voltage level and generates a corresponding signal that consequently transforms into the active flag signal PWR_OK. A delay circuit 212 delays the signal propagation from the output of the sensing circuit 210 to the active flag output signal. The power up circuit 200 also includes the following circuit blocks. A status holding circuit 208 maintaining the enabling level of the active flag signal (in this example, a high voltage level of PWR_OK) by generating signal HOLD* in response to power save signal POWER_SAVE. It is noted that a high voltage level of the POWER_SAVE node in FIG. 5 represents entry into a power save mode of operation. An optional restore circuit 214 quickly resets states of internal nodes of the power up circuit by activating drive circuit 215, upon exit from the power save mode. Drive circuit 215 is represented by a p-channel transistor having a gate terminal for receiving signal RESET* generated by restore circuit 214 in response to signal POWER_SAVE. While not specifically shown in FIG. 5, additional drive circuit components can be included within delay circuit 212. The power up circuit may also comprise a output override circuit 216 for combining the signal from the sensing circuit 210 and the status holding circuit 208, to generate the PWR_OK signal. Output override circuit 216 has the signal of the internal sensing node "n" applied to it's input through the sensing circuit 210 and the delay circuit 212, and a second input for receiving signal HOLD* generated by the status holding circuit 208.

In the present example, the gate of transistor 202 functions as a current disabling means, and receives a power save signal POWER_SAVE. In a further implementation of the present invention, diode-connected transistor 204 can be removed. Such a configuration will generally use larger resistor values to maintain an equivalent power consumption compared to the voltage divider configuration with diode-connected transistor 204. Otherwise, more power will be consumed if the resistor values are not increased after transistor 204 is removed. The resistor means 206 can comprise one or more resistors arranged in a combination of parallel and serial connections, that can be for instance, polysilicon resistors. Signal POWER_SAVE is driven to the high voltage level Vdd when either the sleep mode or deep power down mode is entered. Due to the diode connected configuration of transistor 204, the voltage at the sensing node "n" is restricted to a maximum value of approximately Vdd-Vtp, where Vtp is a threshold voltage of the p-channel transistor 204. Thus, smaller values of the resistors can be used without increasing power consumption. At the same time, as Vtp varies with temperature and process parameters variations, the accuracy of the scheme with the diode-connected transistor will be relatively lower.

The operation of power up circuit 200 is essentially the same as power up circuit 10 shown in FIG. 1. To monitor the Vdd voltage level, the current path through transistors 202, 204 and resistor means 206 is enabled by setting signal POWER_SAVE to the low voltage level Vss. As Vdd rises during power up of the device, the voltage level of the internal sensing node "n" will also rise. Sensing circuit 210 will detect a predetermined voltage level of node "n" and generate an intermediate signal indicating that the Vdd voltage has reached the minimum level. This intermediate signal is delayed by delay circuit 212 before it reaches output override circuit 216. Upon receipt of the intermediate signal, output override circuit 216 will drive the PWR_OK node to the high voltage level.

While signal POWER_SAVE is at the low voltage level Vss, signal RESET* generated by restore circuit 214 remains at the high voltage level Vdd to keep drive circuit 215, as well as any other drive circuits within delay circuit 212, inactive. Status holding circuit 208 remains inactive while POWER_SAVE is at the low voltage level Vss, thus keeping signal HOLD* at the high voltage level Vdd. In output override circuit 216 the logic high voltage level HOLD* signal will allow passage of the signal from the internal sensing node "n" to the active flag output PWR_OK.

When the signal POWER_SAVE is driven to the high logic voltage level, a power saving mode is entered, transistor 202 is turned off to prevent any DC current from flowing through the voltage divider circuit. In response to signal POWER_SAVE being at the logic high voltage level, status holding circuit 208 will drive signal HOLD* to the logic low voltage level, causing output override circuit 216 to keep signal PWR_OK at the logic high voltage level regardless of the voltage level of node "n". Eventually, node "n" will discharge to the Vss voltage level and the previously Vdd high voltage level intermediate signal will fall to Vss. During Vdd monitoring operations when signal POWER_SAVE is at the logic low voltage level, the intermediate signal falling below the critical value due to disruptions or variations in the power supply voltage will cause the signal PWR_OK to change its state. However, while signal POWER_SAVE is at the logic high voltage level, the voltage level of the intermediate signal corresponding to "n" is effectively ignored by the output override circuit 216. Therefore, no DC power is consumed by the voltage divider circuit in the power saving mode while the PWR_OK signal remains at the enabling level.

Upon exit of the power save mode, the POWER_SAVE signal is driven to the logic low voltage level to turn on transistor 202. Restore circuit 214 generates a low logic voltage RESET* pulse in response to the logic high to logic low voltage level transition of the POWER_SAVE signal, to briefly activate drive circuit 215, and any other drive circuits. Due to the brief activation of the drive circuits, node "n" quickly returns to the Vdd voltage level as the drive circuits will override delay of the circuit 210. Status hold circuit 208 is disabled, resulting in the signal HOLD* being driven to the logic high voltage level. Accordingly, the voltage level of the sensing node "n" controls the state of signal PWR_OK again.

A detailed circuit schematic of a power up circuit 300 according to an embodiment of the present invention is shown in FIG. 6. Power up circuit 300 of FIG. 6 is similar to power up circuit 200 of FIG. 5, but further illustrates circuit implementation examples of status holding circuit 208, sensing circuit 210, delay circuit 212, restore circuit 214, and output override circuit 216. The same numbered elements in FIG. 6 correspond to those shown in FIG. 5. The voltage divider circuit 206 of power up circuit 300 includes a single resistor coupled between diode-connected transistor 204 and the Vss power rail. In the presently shown embodiment, signal POWER_SAVE* is generated by a 3-input NOR gate 302 which receives three power saving control signals: sleep signal SLEEP, power down signal PWRDN and power monitor signal PWRMNTR. All three power saving control inputs are identical in terms of their effect on the power up circuit, but they are generated by functionally independent blocks on the chip. The SLEEP signal is generated by a standby mode control block. The PWRDN signal is generated by a power down control block. The PWRMNTR signal is generated by a control block that will enable or disable the power up circuit in the normal mode of operation in order to enable the Vdd monitoring or disable the Vdd monitoring circuit and save power. In alternative embodiments of the power up circuit, some of the power saving control signals can be omitted, depending on available controls and the required functions for the chip. The signal POWER_SAVE* is inverted by inverter 304 to generate signal POWER_SAVE, which is connected to the gate terminal of transistor 202.

The status holding circuit 208 includes NAND gate 308, the series chain of inverters 310, 312 and 314, and, an inverter 316 inverts the output of NAND gate 308 to drive signal HOLD*. Inverters 304, 318, 320, 322, 324 can be considered parts of the status hold circuit 208. In the present example, status holding circuit 208 is implemented as a rising edge delay circuit. The circuit passes transitions of the POWER_SAVE* signal: a falling edge of POWER_SAVE passes on to the HOLD* signal relatively quickly (delayed only by NAND 308 and inverter 316), while a rising edge is transmitted after a delay produced by the chain of inverters 304, 318, 320, 322, 324, 310, 312 and 314. This delay is preferred as the resetting of the circuit by the RESET* signal takes time. Before the signal of the node "n" is allowed to pass through to the PWR_OK output, the NAND gate 340 should hold PWR_OK signal at the high level while the circuit recovers from a power saving mode. The restore circuit 214 includes the series chain of inverters 318, 320, 322 and 324, and NAND gate 326, configured for generating a logic low voltage level pulse RESET* signal. In the present example, restore circuit 214 is implemented as an edge detector. The sensing circuit is implemented with inverter 328, which has its input terminal connected to the internal sensing node "n", and an output connected to the delay circuit comprising of inverters 330 and 332, and capacitor elements 334, 336 and 338.

Preferably, inverter 328 has a complementary pair of transistors, where the p-channel transistor has a standard p-channel threshold, relative to a normal inverter formed on the same die, while the n-channel transistor has a higher threshold relative to a normal inverter formed on the same die, to make the logic threshold higher than for a normal inverter with standard thresholds. Inverter 330 preferably has a high threshold p-channel transistor and a standard threshold n-channel transistor to shift the logic threshold. Inverter 332 is preferably configured as a regular inverter. Alternatively, one or both of the inverters 328 and 330 may be either regular inverters or inverters with their transistors sized so that predetermined voltage level at the internal sensing node "n" is properly sensed and passed with a predetermined time delay. In yet another alternative implementation, a differential input comparator can be used instead of inverter 328 in order to improve precision and stability of the predetermined voltage level sensing. A differential input comparator will be discussed in more detail later.

The output of inverter 332 drives one input of the output override circuit 216, implemented as NAND gate 340 in the embodiment of FIG. 6. The second input of NAND gate 340 receives signal HOLD* generated from status holding circuit 208. Capacitors 334, 336 and 338 are preferably included to keep the nodes they are connected to relatively immune to voltage level changes caused by cross-talk and noise. The capacitors are preferably MOS transistors with source and drain terminals connected together. Alternatively, they can be any kind of structure effective for providing sufficient capacitance, such as MEM structures and metal lines running close to power (Vdd) or ground (Vss) rails respectively.

The drive circuit previously shown as transistor 215 in FIG. 5 is presently shown in FIG. 6 as a set of transistors 215, 344 and 346. Drive transistors 215 and 346 raise the voltage level at the input terminals of inverters 328 and 332 in response to the RESET* pulse signal, while drive transistor 344 lowers the voltage level at the input terminal of inverter 330 in response to an inverted phase of the RESET* pulse signal.

Figure 7:
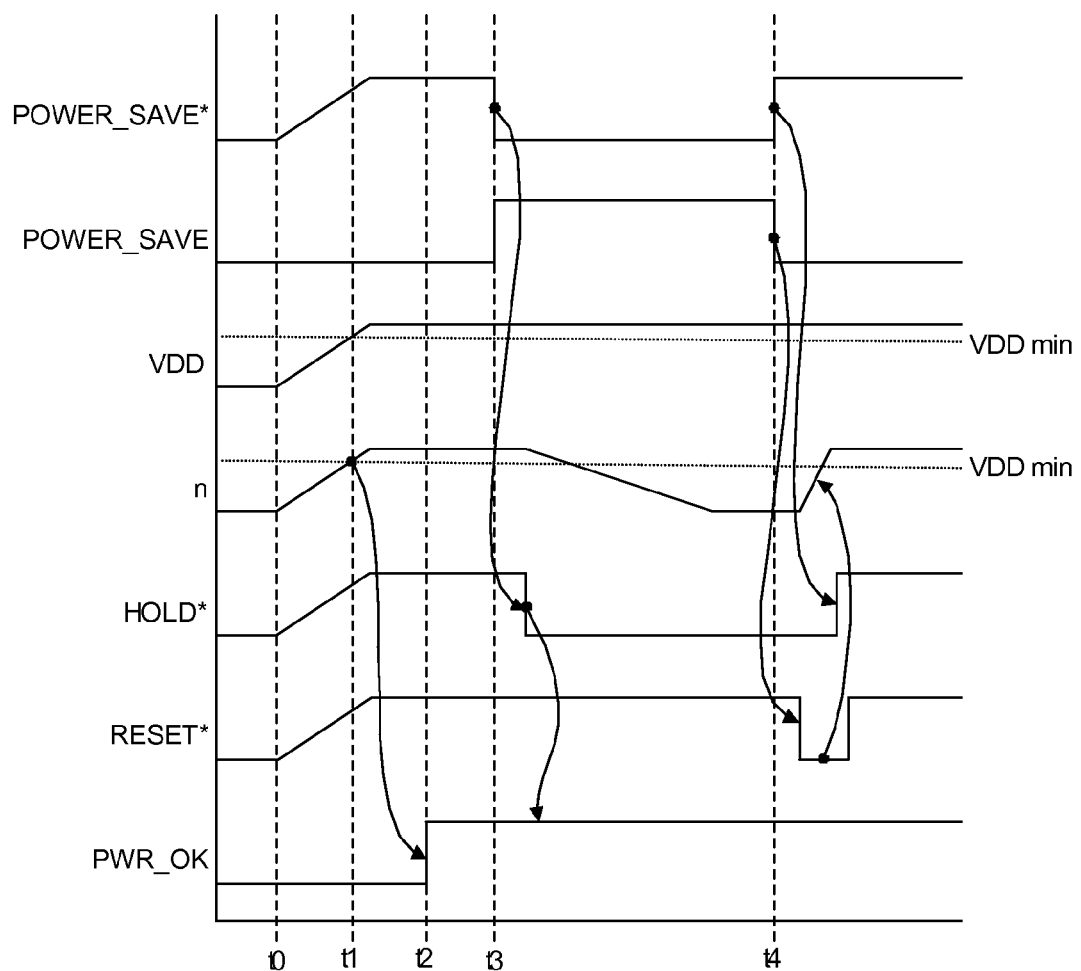
FIG. 7 is a sequence diagram illustrating the operation of the power supply monitoring circuit of FIG. 6.

The operation of power supply monitoring circuit 300 is as follows with reference to the sequence diagram of FIG. 7. The sequence diagram of FIG. 7 illustrates general signal transitions, and does not necessarily represent actual timing relationships between signals. When the power source is turned on at time t0, supply voltage Vdd starts to ramp up, and voltage at node "n" will track Vdd. The POWER_SAVE signal is held at the logic low voltage level to keep coupling transistor 202 turned on. It is now assumed that at time t1 the Vdd power supply voltage reaches the necessary minimum level for proper circuit operation, resulting in the voltage level at the internal sensing node "n" reaching the predetermined voltage level corresponding to the critical level of the power supply voltage. This will trigger inverter 328 to change states and drive the input of inverter 330 to the low voltage level. This low voltage intermediate signal will propagate through the delay inverters 330 and 332 and will reach the input of NAND gate 340 to change signal PWR_OK to the logic high voltage level at time t2. Simultaneously, through the status holding circuit 208 and the restore circuit 214, the low voltage level of POWER_SAVE and the high voltage level of signal POWER_SAVE* will keep signals HOLD* and RESET* respectively at the logic high voltage level.

Upon entry of a power saving mode at time t3, the POWER_SAVE signal will be driven to a logic high voltage level, turning off transistor 202 and driving the HOLD* signal to the logic low voltage level that overrides NAND gate 340 by forcing it's output PWR_OK to the logic high voltage level regardless of the voltage level at the internal sensing node "n". With transistor 202 turned off, the node "n" eventually discharges towards ground or Vss potential. It is noted that the HOLD* signal is driven to the logic low voltage level before the descending voltage level of the node "n" can cause inverter 332 to drive the input of NAND gate 340 to a logic high voltage level. Therefore signal PWR_OK is maintained at the high voltage level. It is noted that the low to high voltage transition of POWER_SAVE has no effect on restore circuit 214.

Upon exiting the power saving mode at time t4, signal POWER_SAVE is driven back to the logic low voltage level, causing status holding circuit 208 to drive the HOLD* signal to the high voltage level so that NAND gate 340 will pass the signal from the internal sensing node "n". The logic high to logic low voltage level transition of signal POWER_SAVE forces the restore circuit 214 to generate a low voltage RESET* pulse to briefly turn on the drive circuit consisting of drive transistors 215, 344 and 346. The voltage level of the internal sensing node "n" is thus fast restored and becomes again indicative of the Vdd power supply voltage level being at least equal or above the desired minimum voltage level.

Therefore, the presently shown power up circuit embodiment maintains the PWR_OK signal at the active level during power saving modes, while reducing power consumption. Those skilled in the art will appreciate that the configuration of the aforementioned circuits as well as logical level of the signals can be modified in order to achieve the same desired result without departing from the scope of the present invention. Furthermore, those of skill in the art will understand that the number of inverter elements in status holding circuit 208, restore circuit 214, and the delay circuit can be selected to achieve any desired amount of delay. While output override circuit 216 is implemented as NAND gate 340 in the power up circuit embodiment of FIG. 6, those of skill in the art will appreciate that different types of circuits can be employed to achieve the same result.

FIG. 8 is a circuit schematic illustrating an example of an alternative implementation of output override circuit 216 that can be used for instance in the power up circuit embodiment of FIG. 6. Override circuit 216 of FIG. 8 is a simple combination of a transmission gate 220 having an input "a" for receiving the output of inverter 332 in FIG. 6 and an output PWR_OK, and a p-channel pull-up transistor 222 for coupling active flag output PWR_OK to the Vdd power supply or rail. Pull up transistor 222 has its drain terminal connected to PWR_OK, and its gate terminal receives the HOLD* signal. The HOLD* signal is also connected to the gate terminal of n-channel transistor of transmission gate 220. The inverted HOLD* signal at the output of inverter 224 drives the gate of the p-channel transistor of transmission gate 220. When the HOLD* signal is driven to the low voltage level, transmission gate 220 de-couples signal PWR_OK from sensing node "n", while pull-up transistor 222 is turned on to keep PWR_OK at the high voltage level. In yet another alternative implementation, a 2-to-1 multiplexor can be used, where a first input can be node "a" while the second input can be connected to a pull-up transistor, with HOLD* functioning as the input selection signal.

Figure 9:
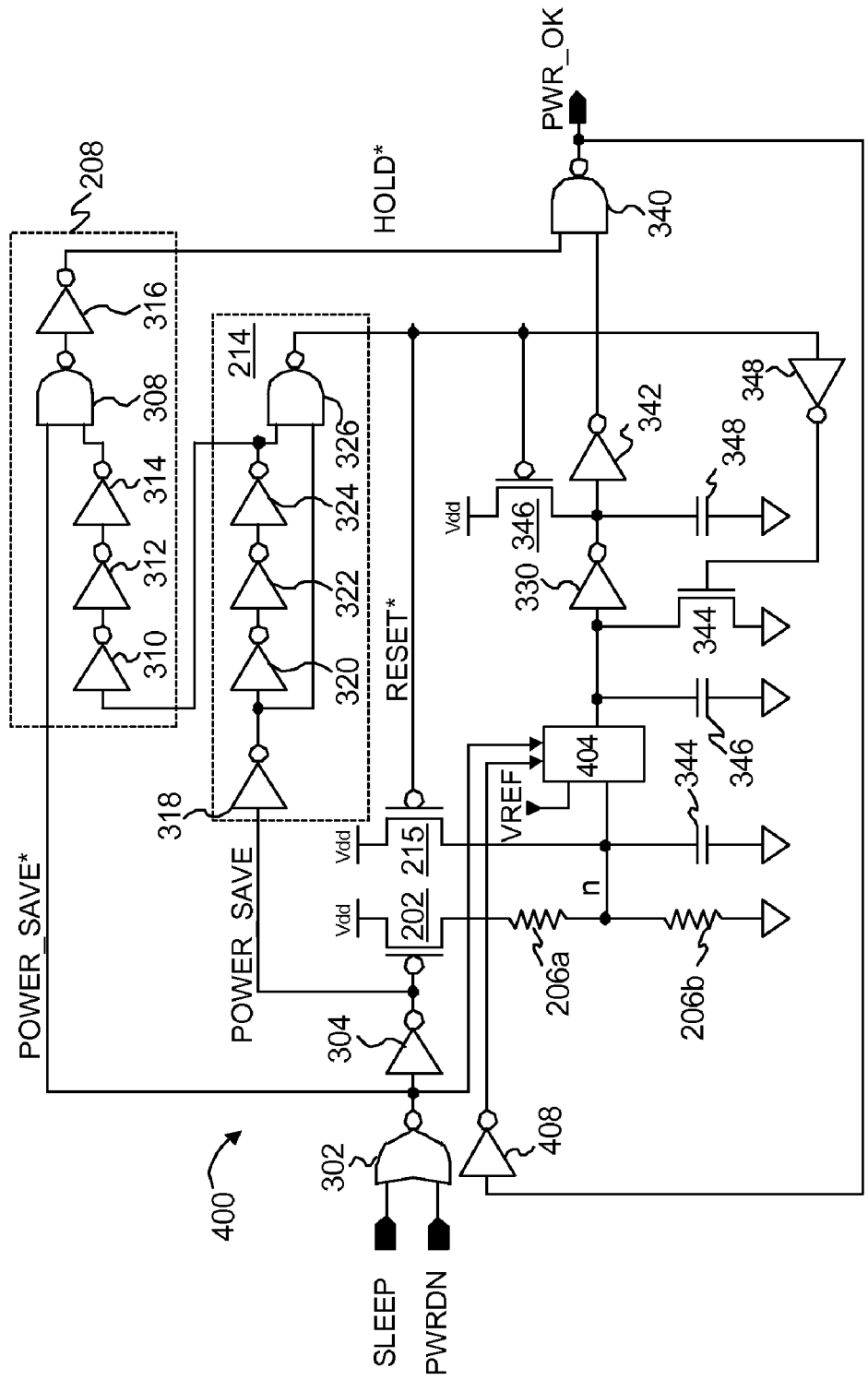
FIG. 9 is a circuit schematic of a power supply monitoring circuit with a power saving mode of operation according to another embodiment of the present invention.

FIG. 9 is a schematic of a power up circuit according to another embodiment of the present invention. Circuit 400 is similar to circuit 300 of FIG. 6, where same numbered elements have been previously described for FIG. 6, but includes some variations. More specifically, the power up circuit 400 is now configured to receive two power down signals, mainly sleep signal SLEEP and power down signal PWRDN. Diode connected transistor 204 is replaced with resistor element 206a, and inverter 328 is replaced with sense circuit 404 for sensing voltage level at the node "n". As previously discussed, the advantage of having resistor 206a is to obtain accurate and stable operation. Sense circuit 404 receives POWER_SAVE* signal from NOR gate 302 and feedback of PWR_OK signal via inverter 408 to turn the sense circuit into a low power mode of operation. Further details of sense circuit 404 will be discussed with reference to FIG. 10.

Figure 10:
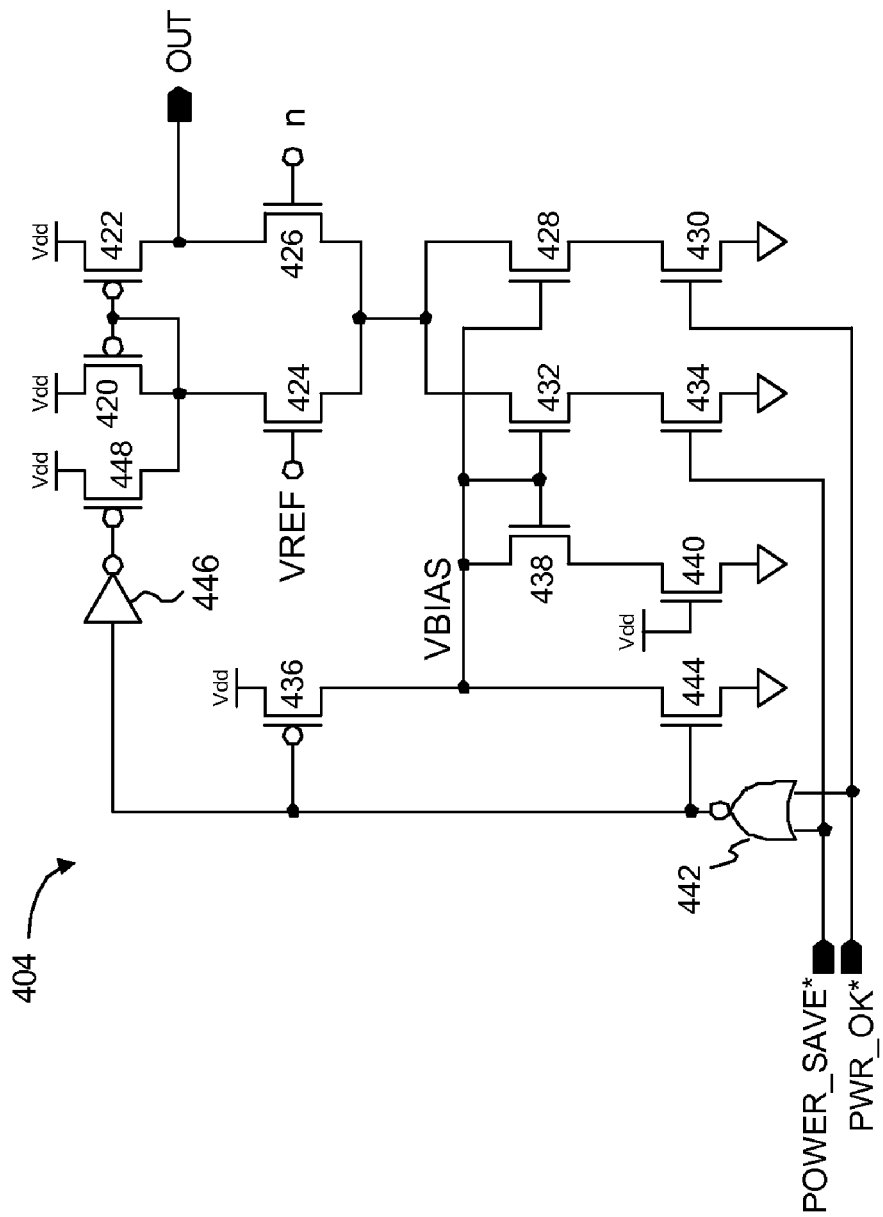
FIG. 10 is a circuit schematic of the comparator circuit in the power supply monitoring circuit of FIG. 9.

FIG. 10 is a circuit schematic of the sense circuit 404 shown in FIG. 9. Sense circuit 404 according to an embodiment of the present invention includes a differential amplifier circuit, and power control circuitry. Sense circuit 404 can operate in one of three modes. First is a normal mode, second is a low power mode, and third is a disable mode. This differential-type circuit provides improved precision and stability over a simple inverter based sense circuit as shown in FIG. 6.

The differential amplifier includes p-channel transistors 420 and 422 arranged in a current mirror configuration, and n-channel input transistors 424 and 426. Input transistor 424 receives reference voltage VREF while input transistor 426 is coupled to node "n". The connected together drain terminals of transistors 422 and 426 drive output OUT, which is connected to the input of inverter 330 in FIG. 9.

The current source circuit consists of two selectable parallel current path branches connected to the source terminals of transistors 424 and 426, and a bias voltage circuit. The first current path includes serially connected n-channel transistors 428 and 430 between the source terminals of transistors 424 and 426 and Vss, while the second includes serially connected n-channel transistors 432 and 434 between the source terminals of transistors 424 and 426 and Vss. Transistors 428 and 432 receive a bias voltage VBIAS at their gate terminals, while transistors 430 and 434 respectively receive signals PWR_OK* and POWER_SAVE*, where PWR_OK* is the inverted PWR_OK by inverter 408 in FIG. 6. In the presently shown embodiment, transistor 430 functions as a current disabling means for disabling the current path through transistors 428 and 430. Similarly, transistor 434 is a current disabling means for disabling the current path through transistors 432 and 434. The bias voltage circuit includes p-channel transistor 436 and n-channel transistors 438 and 440 serially connected between Vdd and Vss power rails. Transistor 438 is diode connected while the gate of transistor 440 is tied to the Vdd power rail. The drain terminal of transistor 436 is connected to the gates of transistors 428 and 432 to select the current path therein.

The power control circuitry includes NOR gate 442, n-channel transistor 444 inverter 446 and p-channel transistor 448. NOR gate 452 receives at its inputs the signals POWER_SAVE* and PWR_OK* and has its output connected to the gates of transistors 436, 444, and the input of inverter 446 which drives the gate of transistor 448. In the presently shown example, the circuit combination of NOR gate 442 and transistor 444 functions as current disabling means for disabling the current path through transistor 436, 438 and 440.

The normal low power and disable modes of sense circuit 404 will now be described. During initial power up of the device, it is assumed that signals POWER_SAVE* and PWR_OK* are at the logic high voltage level to keep transistors 430 and 434 turned on, and the output signal OUT is at the logic low voltage level. Hence both branches of the current source circuit (transistors 430 and 434) are on to maximize sensing speed at the expense of increased current consumption. With both POWER_SAVE* and PWR_OK* signals at the logic high voltage level, the logic low voltage output of NOR gate 442 turns on transistor 436 and keeps transistors 444 and 448 turned off. Eventually, the node "n" rises to the critical level and OUT will rise to the logic high voltage level. In FIG. 9, PWR_OK will change from the logic low voltage level to the logic high voltage level to indicate that the voltage level Vdd has reached the required minimum voltage level. Therefore, PWR_OK* will change to the logic low voltage level to turn off transistor 430 and disable the first current path. Now that Vdd is deemed to be stable, fast circuit reaction may no longer be needed for the Vdd monitoring mode of operation, and the amount of current consumption is therefore reduced. Therefore, sense circuit 404 self-enters a low power monitoring mode due to the feedback of PWR_OK signal.

Assuming that the circuit is presently operating in the Vdd low power monitoring mode, turning to the power saving mode will conserve further power in the sense circuit 404. In the power saving mode, POWER_SAVE* is set to the low voltage level. This turns off transistor 434, and through NOR gate 442, turns off transistor 436 and turns on transistors 444 and 448. Transistor 444 then turns off transistors 428 and 432, while transistor 448 turns off transistors 420 and 422. Although the node OUT floats, its voltage level is not important since the status holding circuit 208 keeps the signal PWR_OK at the logic high voltage level during the power saving mode. Alternatively, another p-channel transistor with it's source connected to Vdd power rail, drain connected to node OUT and gate connected to the gate of transistor 448 can be used in order to pull the node OUT up to the Vdd level in the disable mode. Yet another alternative can be an n-channel transistor with it's source connected to the Vss rail, drain connected to node OUT and gate connected to the output of the NOR gate 442 to pull node OUT down to the Vss voltage level in the disable mode. Other alterations are also possible depending on the particular requirements to the state of OUT in the disable mode.

An advantageous feature of sense circuit 404 is the minimized number of transistors used for implementing the normal and low power monitoring modes. As previously shown in FIG. 2, prior art implementations of similar circuits comprises duplicate differential amplifier circuits. In contrast, the sense circuit 404 uses a single differential amplifier circuit having a current source circuit that can selectively control the amount of current used by the differential amplifier circuit that can be used to save silicon area.

Figure 2:
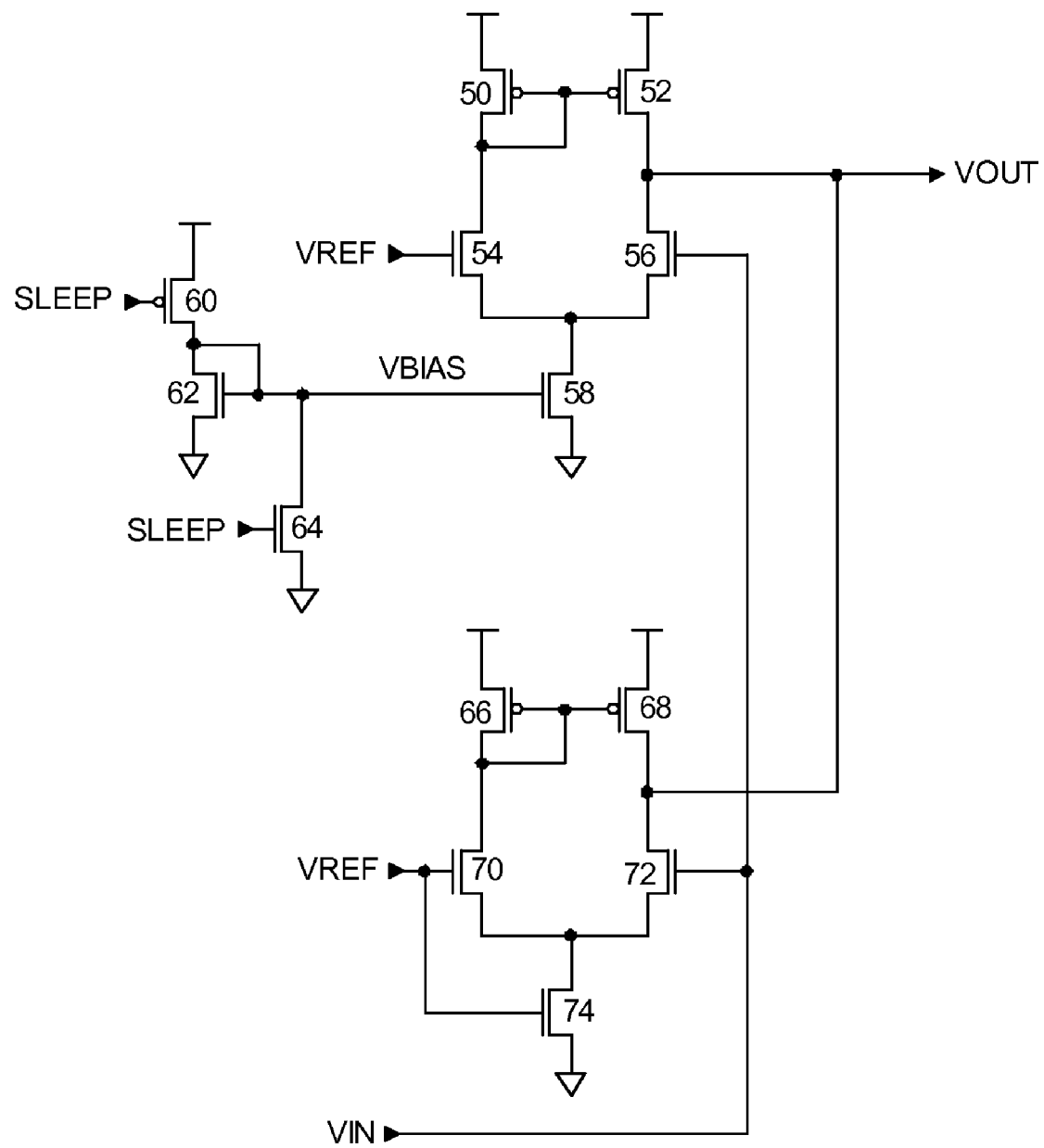
FIG. 2 is a circuit schematic of a prior art comparator circuit.
Figure 11:
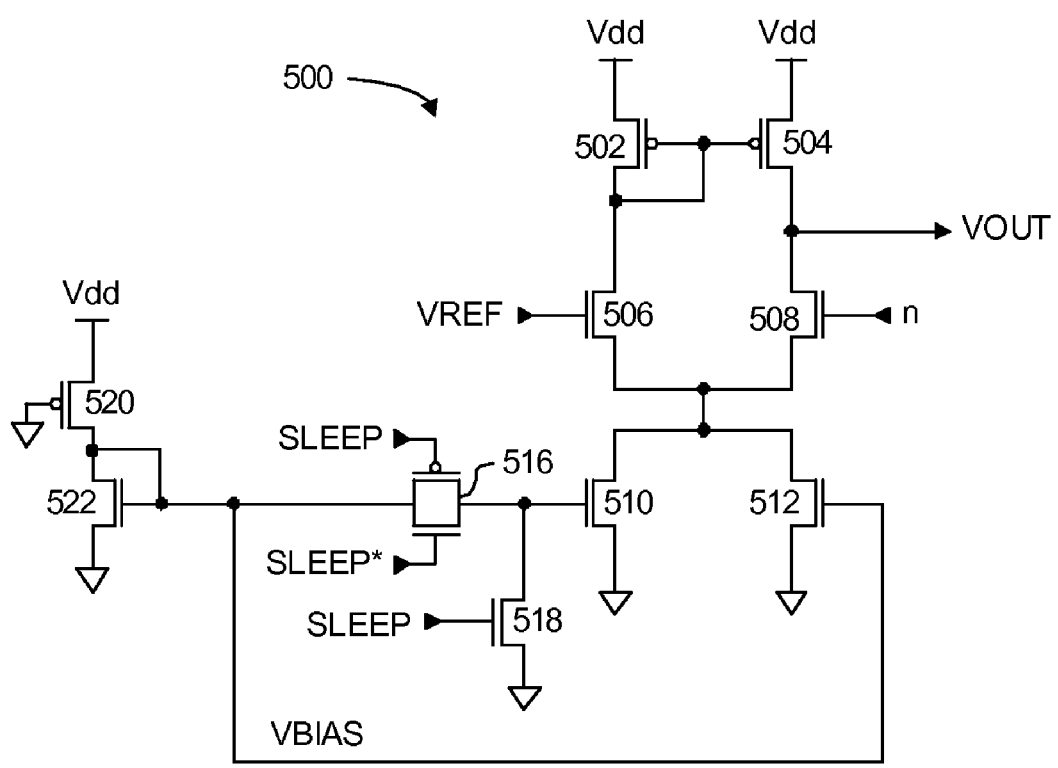
FIG. 11 a circuit schematic of a comparator circuit according to an embodiment of the present invention; and, FIG. 12 a circuit schematic of another comparator circuit according to an embodiment of the present invention.

To further illustrate the silicon area savings advantage provided by the selectable current source circuit technique shown in FIG. 10, the prior art comparator circuit of FIG. 2 has been modified as shown in FIG. 11 to operate with a single differential amplifier circuit.

FIG. 11 is a circuit schematic of a low power comparator circuit designed to be selectively operable between a low power consumption mode and high speed operation mode. The comparator circuit 500 includes a differential amplifier circuit consisting of p-channel transistors 502 and 504 arranged in a current mirror configuration, n-channel input transistors 506 and 508, and n-channel current source transistors 510 and 512. Low power logic circuitry consisting of transmission gate 516 and pull down transistor 518 is included to control transistor 510. The common terminal of transistors 504 and 508 is connected to the node VOUT. The gate terminal of transistor 506 is connected to reference voltage VREF and the gate terminal of transistor 512 is connected to bias voltage VBIAS. The gate terminal of transistor 510 is selectively connected to VBIAS through transmission gate 516, which is controlled by complementary signals SLEEP and SLEEP*. The gate terminal of transistor 510 is further coupled to ground via n-channel pull down transistor 518 having its gate terminal connected to signal SLEEP. VBIAS is generated from the bias voltage generator circuit comprising of p-channel transistor 520 and diode connected n-channel transistor 522, serially connected between power rails Vdd and Vss. In the presently shown embodiment, current source transistor 512 is preferably sized to draw less current than transistor 510. However, transistors 510 and 512 can be sized in a different way, depending on the circuit characteristic requirements.

The value of the current in the current source and the size ratio of the current mirror determines the response time of the comparator circuit 500. During the fast mode, comparator circuit 500 requires a relatively large current to obtain a fast response time. For example, both transistors 510 and 512 are turned on in the fast mode of operation while the SLEEP signal is at the logic low voltage level. However, in the sleep mode when the SLEEP signal is set to the logic high voltage level, a reduction of operating current can be obtained by disabling transistor 510. This is achieved by turning off transmission gate 516 via the logic high voltage level of the SLEEP signal and activating pull down transistor 518. In the power saving mode, rapid changes of state are not necessarily critical but the comparison function is maintained.

As is clearly seen by any person of skill in the art, one of the advantages achieved by comparator circuit 500 of FIG. 11, is that one differential amplifier circuit can be used for generating the signal VOUT for both normal and sleep modes, further saving significant semiconductor area.

Figure 12:
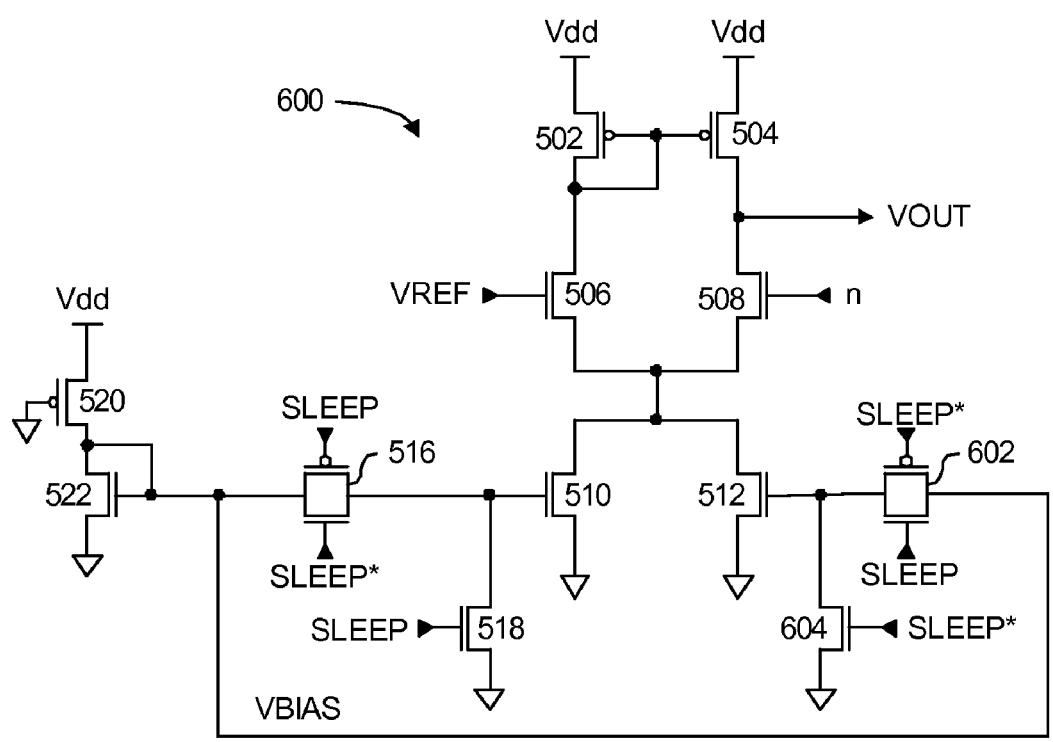

FIG. 12 is a circuit schematic of an alternate comparator circuit according to an embodiment of the present invention. Comparator circuit 600 differs from the comparator circuit 500 of FIG. 11, particularly on the configuration to activate one of the transistors 510 and 512. More specifically, the power control circuitry now further includes transmission gate 602 for selectively coupling VBIAS to the gate of transistor 512, and pull down transistor 604 connected to the gate of transistor 512. Transmission gate 602 disconnects VBIAS from transistor 512 when the SLEEP signal is at the logic low voltage level (corresponding to normal mode of operation), and pull down transistor 604 is turned on via signal SLEEP* when signal SLEEP is at the logic low voltage level. Furthermore, transistors 510 and 512 can be sized to optimize speed and power consumption for the normal and sleep modes of operation.

The previously discussed power up circuits 100, 200, 300 and 400 are examples of circuits that can save significant DC power by selectively turning off the voltage divider circuit in a power saving mode of operation. The common feature shared by all the power up circuit embodiments, is that power is conserved by cutting off the current path between the Vdd and Vss power rails through the voltage divider, but maintains the active level PWR_OK signal for the remaining circuits of the chip. The voltage divider circuit can be selectively disabled, and an optional restore circuit can be included to drive the nodes of the power up circuit to their original levels upon exit from the power save mode to the normal mode.

The selectable current source circuit technique shown in FIGS. 9, 10 and 11 can be applied to multi-mode comparator circuits to further reduce power consumption in a power saving mode of operation, while minimizing the number of transistor elements required to implement the multi-mode functionality.

The low power, power up circuit techniques described above can be applied to memory devices, such as DRAM, embedded DRAM, SRAM, embedded SRAM, Flash and other non-volatile memories which have circuits that are operable in low power consumption modes. Furthermore, non-memory devices such as microcontrollers, microprocessors and circuit systems and IP blocks having any type of low power mode can employ the previously described power up circuit techniques.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A comparator circuit for comparing a reference voltage to a node voltage in a power status indicator system, the comparator comprising:
   a differential amplifier for receiving the reference voltage and node voltage and asserting an output signal only when the node voltage is greater than the reference voltage and at least one of a power up signal and a low power mode signal is asserted;
   a first current source for supplying current to the differential amplifier when the low power mode signal is asserted; and
   a second current source for supplying current to the differential amplifier when the power up signal is asserted.

2. The comparator circuit as claimed in claim 1, further comprising a bias generator for supplying a bias voltage to the first and second current sources.

3. The comparator circuit as claimed in claim 2, wherein the bias generator supplies the bias voltage to the first and second current sources when at least one of the power up signal and the low power mode signal is asserted.

4. The comparator circuit as claimed in claim 1, wherein the first current source provides substantially zero current to the differential amplifier when the low power mode signal is de-asserted.

5. The comparator circuit as claimed in claim 1, wherein the second current source provides substantially zero current to the differential amplifier when the power up signal is de-asserted.

6. A method of comparing a reference voltage to a node voltage in a power status indicator system, the method comprising:
   supplying a first current to a differential amplifier when a low power mode signal is asserted;
   supplying a second current to the differential amplifier when a power up signal is asserted; and
   asserting an output signal of the differential amplifier only when the node voltage is greater than the reference voltage.

7. The method of comparing a reference voltage to a node voltage as claimed in claim 6 further comprising:
   de-asserting the power up signal and thereby not supplying the first current to the differential amplifier.

8. The method of comparing a reference voltage to a node voltage as claimed in claim 7 further comprising:
   de-asserting the low power mode signal and thereby not supplying the second current to the differential amplifier.

* * * * *